Jan. 1, 1963     A. N. SZWARGULSKI     3,071,251
FUEL FILTER
Filed Jan. 4, 1960     2 Sheets-Sheet 1
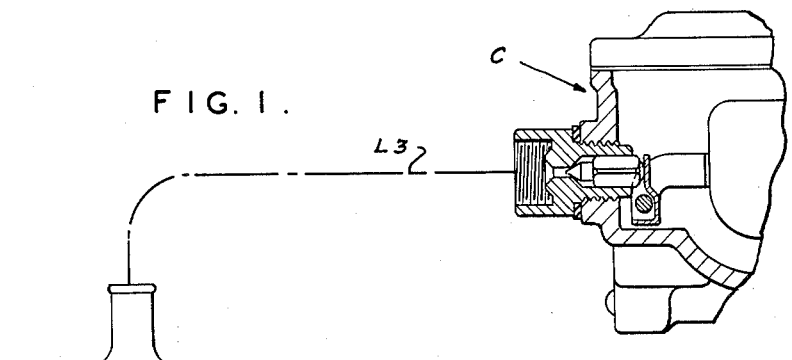
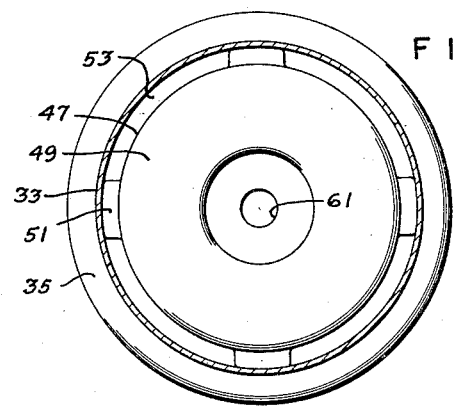
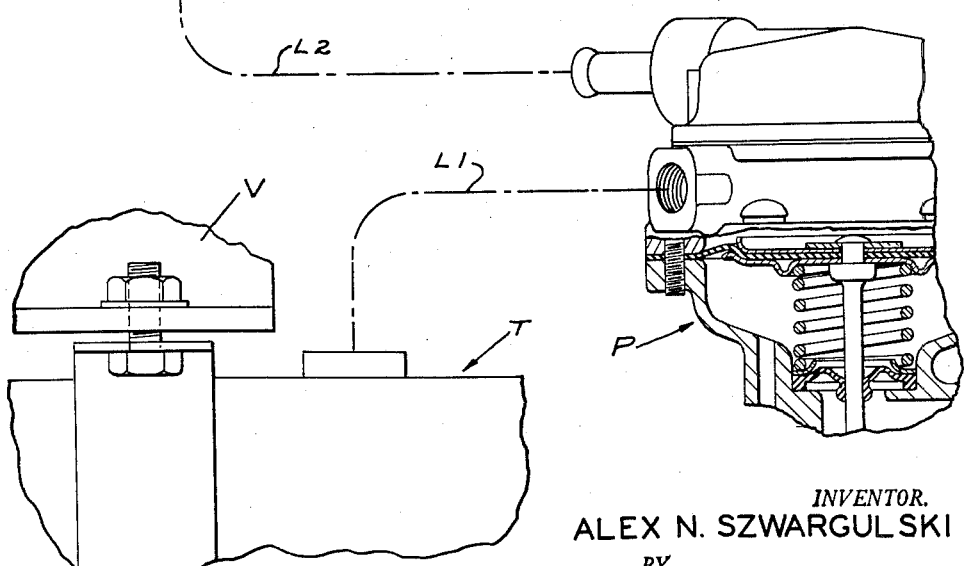
*INVENTOR.*
ALEX N. SZWARGULSKI
BY
AGENT Jan. 1, 1963   A. N. SZWARGULSKI   3,071,251
FUEL FILTER Filed Jan. 4, 1960   2 Sheets-Sheet 2

*INVENTOR.*
ALEX N. SZWARGULSKI
BY
AGENT 3,071,251
FUEL FILTER
Alex N. Szwargulski, St. Louis, Mo., assignor to ACF Industries, New York, N.Y., a corporation of New Jersey
Filed Jan. 4, 1960, Ser. No. 243
2 Claims. (Cl. 210—349)

This invention relates to filters, and more particularly to a filter for use in a fuel line of a fuel system of an automotive vehicle adapted to filter fuel flowing through the line to the engine of the vehicle.

Among the several objects of the invention may be noted the provision of an improved in-the-line filter of the class described which is economical to manufacture and easy to install, which has sufficient dirt loading capacity for its intended purpose, and which is adapted to withstand stresses incurred in use on an automotive vehicle, particularly stresses caused by vibration; the provision of a filter such as described comprising a sheet metal housing and a filter element contained in the housing which is of such construction that, in use, a relatively small volume of fuel is contained therein and the total weight of the filter (including the fuel therein) is relatively low, as a result of which the inertia of the filter is relatively low, and failures due to vibration are thereby substantially eliminated; the provision of a filter such as described in which the filter element is advantageously constituted by a pleated strip of filter paper formed into a hollow cylinder with the pleats extending lengthwise of the cylinder; and the provision of a filter such as described which may be so constructed as to incorporate an air dome therein to reduce pulsations in the fuel system in which it is connected. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated.

FIG. 1 is a view showing a filter of this invention connected in a typical automotive fuel system;

FIG. 4 is a transverse section taken on line 4—4 of FIG. 2;

Corresponding reference characters indicate corresponding parts throughout the several views of the drawings.

Referring to FIG. 1 of the drawings, a fuel filter F of this invention is shown connected in a line between a typical automotive fuel pump P and a typical carburetor C. Fuel is supplied to the pump P from fuel tank T of the automotive vehicle through a line L1. The pump delivers fuel to the inlet of filter F through a line L2, and fuel is delivered from the outlet of the filter to carburetor C through a line L3.

Figure 2:
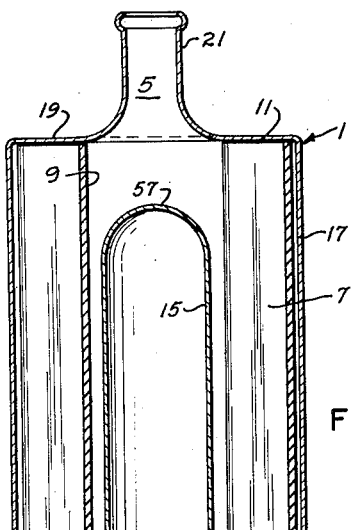
FIG. 2 is a longitudinal cross section of the filter.
Figure 3:
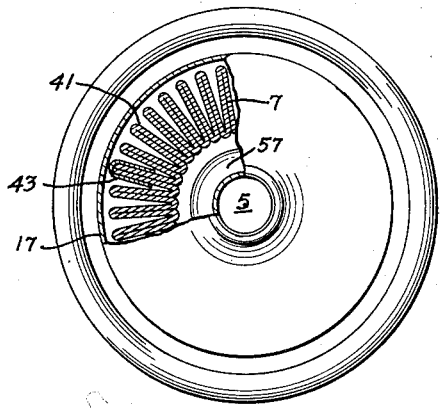
FIG. 3 is an end view of the filter as viewed from its outlet end, partly broken away and shown in section.

As shown in FIGS. 2–4, the fuel filter F of this invention essentially comprises a housing 1 having an inlet 3 at one end and an outlet 5 at the other. Within the housing is a tubular filter element 7. The axial passage in this filter element is designated 9. One end of the filter element is sealed as indicated at 11 to the housing at the outlet end of the latter all around the outlet 5, and the filter element extends from the outlet end of the housing toward but terminates short of the inlet end of the housing. A closure 13 is sealed to the other end of the filter element as indicated at 14 for sealing this end of the filter element and the interior passage 9 of the filter element from the inlet. A member 15 extends from closure 13 interiorly of the filter element 7 in passage 9 toward the outlet 5, terminating short of the latter, and substantially filling the space within the filter element.

Housing 1 is a two-part housing, comprising a cylindrical sheet metal container 17 having an integral circular end wall 19 at one end formed with an integral outlet nipple 21 defining outlet 5, and a sheet metal end cap 23 closing the other end of the cylindrical container 17 and formed with an integral inlet nipple 25 defining inlet 3. The outlet nipple 21 extends centrally outward from container end wall 19, the latter being substantially flat around the nipple. Container 17 has an outwardly extending substantially flat annular flange 27 at its other end, this flange having an annular rim portion 29 extending in the direction toward the outlet end of the container.

Figure 5:
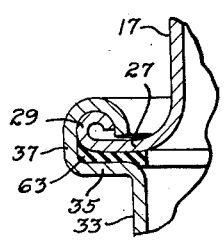
FIG. 5 is an enlarged fragment of FIG. 2.

End cap 23 is of cup shape having a circular base portion 31 with an annular cylindrical wall 33 of somewhat larger diameter than container 17. Wall 33 has an outwardly extending substantially flat annular flange 35 at its rim, this flange having an annular skirt 37 at its periphery extending in the direction away from the base portion 31 of the cap dimensioned to receive the rim portion 29 of the container (see FIGS. 2 and 5). The inlet nipple 25 extends centrally outward from the base portion 31. In stamping the cap, reinforcing ribs such as indicated at 39 are formed.

The filter element 7 consists of a strip of paper which is pleated as indicated at 41, after which it is formed into a hollow cylinder with the pleats 41 extending lengthwise thereof, being held in cylindrical form by crimping a sheet metal clip 43 on the ends of the strip. The filter element may be formed of any suitable fuel-resistant filtration paper, such as a phenolic-impregnated filter paper, adapted to filter out particles such as may be present in fuel at flow rates typically encountered in automotive fuel systems. The length of the hollow cylindrical filter element 7 is somewhat greater than that of the container 17, but less than the length of the housing 1 from end wall 19 to base 31. The outside diameter of the filter element is preferably only slightly less than the inside diameter of container 17, so that there is very little clearance between the filter element and the container.

The filter element end closure 13 consists of a circular sheet metal disk having a central cylindrical boss 45 of somewhat smaller exterior diameter than the internal diameter of filter element 7 and an annular cylindrical peripheral wall 47 extending in the same direction as boss 45 and having an interior diameter corresponding to the external diameter of filter element 7. Wall 47 and boss 45 define an annular flat-bottomed recess 49 receiving that end of the filter element toward the inlet end of the housing 1. Wall 47 has radially outwardly extending projections or ears 51 (see FIG. 4) spaced at intervals around its rim. There may be four such ears, for example, spaced at 90° intervals around the rim of wall 47. These ears extend out to wall 33 of end cap 23 to support the end of filter element in the cap and hold it centered. Between the ears are spaces 53 for flow of fuel from the space 55 in cap 23 between the cap and the filter element end closure 13 around the closure 13 and in between the pleats 41 of the filter element 7. This space 55 constitutes an inlet chamber.

The member 15 is a tubular sheet metal member closed at its end toward the outlet end of the filter as indicated at 57 and having an enlarged end portion 59 constituting a socket for reception of boss 45 on closure 13. The boss has a press fit in socket 59. Member 15 has an external diameter somewhat less than the internal diameter of filter element 7 and is somewhat shorter than the filter element so that it terminates short of the outlet end of the housing 1. As shown in FIGS. 2 and 4, the boss 45 has a central hole 61 providing for communication between inlet chamber 55 and the space in hollow member 15.

In manufacturing the filter, a preliminary assembly is made of the closure 13, the hollow member 15 and the filter element 7, the closure 13 and the member 15 being pressed together, and the filter element then being applied over the member 15, the end of the filter element being socketed in recess 49 and adhered by suitable fuel-resistant adhesive as indicated at 14 to the flat bottom portion of recess 49 of the closure 13 around the boss 45. The adhesive is cured as by heating under pressure between the closure 13 and the end of the filter element. The stated assembly is then entered in the container 17, and the other end of the filter element (its forward end) is adhered by suitable fuel-resistant adhesive as indicated at 11 to the flat portion of the container end wall 19 around the outlet 5. This adhesive is also cured as by heating under pressure. Then end cap 23 is applied, a gasket 63 of suitable fuel-resistant material being positioned between flange 35 on the cap and flange 27 on the container 17, and the skirt 37 of the cap is rolled around the rim portion 29 of the cap tightly to hold the parts together with pressure on the gasket to provide a sealed joint (see FIGS. 2 and 5). An alternative structure to the use of a gasket 63 would be an adhesive which could be applied to either flange 35 or flange 27, or both, and of a material which could be cured after the assembly of the filter.

Figure 6:
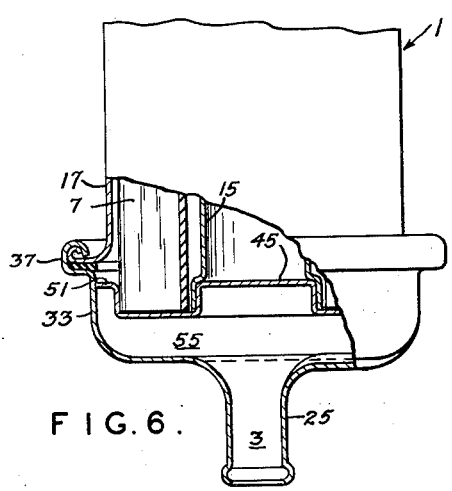
FIG. 6 is a view showing a modification.

With the hole 61 in the boss 45 providing for communication between inlet chamber 55 and the interior of hollow member 15, the latter is adapted to provide an air dome, and for this purpose the filter is installed in upright position with its outlet end up, as shown in FIGS. 1 and 2. Line L2 is connected to filter inlet nipple 25 and line L3 is connected to filter outlet nipple 21. Fuel delivered by pump P to the inlet chamber 55 flows through spaces 53 between ears 51 on the filter end closure 13 to the outside of the filter element 7, passes through the latter to the interior 9 thereof, and thence out through the outlet 5 and is delivered by line L3 to the carburetor C. With the small clearance between filter element 7 and container 17, and with the hollow member or dome 15 substantially filling the space within the filter element 7, the volume of fuel in the filter is relatively low and the inertia of the filter is thereby minimized. This minimizes the possibility of failure of the filter, such as fracture of the end cap 23, under stresses caused by vibration. With hole 61 in the boss 45 and the filter installed as described, air is trapped in member 15 to create an air dome thereby reducing pulsations in the system. If this air dome feature is not desired, then boss 45 may be formed without a hole, as shown in FIG. 6. Member 15 then functions as a lightweight space filler within filter element 7. It is contemplated that member 15 could then be constituted by a solid member, as distinguished from a hollow member, made from lightweight material having a lower specific gravity than fuel.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A filter for liquid comprising a cylindrical housing adapted to be disposed in a vertical position and having a lower end closure wall with a centrally located outwardly projecting nipple defining an inlet opening and an upper end closure wall having a centrally located outwardly projecting nipple defining an outlet opening, a tubular filter element axially mounted in and inwardly spaced from said housing between said inlet and outlet ends, said tubular filter element having its upper end sealed to the inner face of the upper end wall of said housing around said outlet opening, the lower end of said filter element extending towards but terminating short of said lower end wall at the inlet end of said housing, a closure sealed to the lower end of said filter element for sealing said filter element end and the interior of said filter element from said inlet, said closure and said lower end wall of said housing defining therebetween a lower fluid chamber communicating with said inlet opening, said closure including a centrally arranged hollow upwardly extending annular boss defined by an annular side wall and a top plate, said boss extending upwardly within the lower end of said filter element in spaced relation therewith, said closure element including an outer annular upwardly projecting portion spaced from the annular side wall of the boss and arranged parallel therewith and defining between said side wall and said outer annular wall an annular seat for receiving and seating the bottom end of said filter element, a plurality of spaced ears radially projecting from the upper marginal edge of said outer annular upwardly projecting portion for engaging the wall of the housing to hold the filter element centered therein and to define passageways for the flow of fluid from the lower fluid chamber to said filter, and a rigid hollow member positioned within said filter element and extending upwardly therein and substantially filling the interior of said filter element, said hollow member having a lower annular offset flange for seating about said inner annular boss and between the annular wall of said boss and said filter element for retaining the parts in seated relation.

2. The structure of claim 1 characterized in that the top plate of said boss is formed with a central opening to permit entrance of the liquid from the lower fuel chamber to provide an air cushion therefor.

References Cited in the file of this patent

UNITED STATES PATENTS

| 1,750,997 | Feldmeir | Mar. 18, 1930 |
| 2,094,457 | Lattner | Sept. 28, 1937 |
| 2,562,361 | Kasten | July 31, 1951 |
| 2,661,845 | Sullivan | Dec. 8, 1953 |
| 2,739,916 | Parker | Mar. 27, 1956 |